United States Patent
Gao et al.

(10) Patent No.: US 10,972,266 B2
(45) Date of Patent: Apr. 6, 2021

(54) METHOD, APPARATUS AND COMPUTER PROGRAM PRODUCT FOR MANAGING ENCRYPTION KEY IN A STORAGE SYSTEM

(71) Applicant: EMC IP Holding Company LLC, Hopkinton, MA (US)

(72) Inventors: Hongpo Gao, Beijing (CN); Geng Han, Beijing (CN); Jibing Dong, Beijing (CN); Shaoqin Gong, Beijing (CN); Haiying Tang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 188 days.

(21) Appl. No.: 16/220,278

(22) Filed: Dec. 14, 2018

(65) Prior Publication Data

US 2020/0028678 A1   Jan. 23, 2020

(30) Foreign Application Priority Data

Apr. 28, 2018   (CN) .......................... 201810404847.4

(51) Int. Cl.
*H04L 9/08* (2006.01)
*G06F 12/10* (2016.01)

(52) U.S. Cl.
CPC .......... *H04L 9/0891* (2013.01); *G06F 12/10* (2013.01); *H04L 9/0819* (2013.01); *H04L 9/0822* (2013.01); *H04L 9/0894* (2013.01); *G06F 2212/262* (2013.01)

(58) Field of Classification Search
None
See application file for complete search history.

(56) References Cited

U.S. PATENT DOCUMENTS

| | | | |
|---|---|---|---|
| 8,010,810 B1 * | 8/2011 | Fitzgerald | H04L 9/0894 713/193 |
| 8,166,314 B1 | 4/2012 | Raizen et al. | |
| 8,170,213 B1 * | 5/2012 | Harwood | H04L 9/0822 380/277 |
| 8,190,921 B1 | 5/2012 | Harwood et al. | |
| 8,261,068 B1 | 9/2012 | Raizen et al. | |
| 8,416,954 B1 | 4/2013 | Raizen et al. | |
| 8,498,417 B1 | 7/2013 | Harwood et al. | |
| 8,588,425 B1 | 11/2013 | Harwood et al. | |

(Continued)

*Primary Examiner* — Michael Pyzocha
(74) *Attorney, Agent, or Firm* — BainwoodHuang (57) ABSTRACT

Techniques manage an encryption key in a storage system. The techniques involve: transmitting an encryption key request from a storage management component to a key management service component; obtaining, via the key management service component, an encryption key encrypted by the key management service component based on the encryption key request; providing the obtained encrypted encryption key to the storage management component; maintaining, in the storage management component, correspondence between the encrypted encryption key and a storage device; and registering, according to the correspondence, the encrypted encryption key corresponding to the storage device to an encryption hardware unit, such that the encryption hardware unit can decrypt the encrypted encryption key to obtain the encryption key corresponding to the storage device. Effective management of the encryption key is thus realized.

21 Claims, 6 Drawing Sheets

(56) References Cited

U.S. PATENT DOCUMENTS

| | | |
|---|---|---|
| 8,799,681 B1 | 8/2014 | Linnell et al. |
| 8,863,124 B1* | 10/2014 | Aron .................. G06F 13/4221 |
| | | 718/1 |
| 8,966,281 B1 | 2/2015 | Raizen et al. |
| 9,081,771 B1 | 7/2015 | Faibish et al. |
| 9,288,042 B1 | 3/2016 | Madhukar et al. |
| 9,342,465 B1 | 5/2016 | Meiri |
| 9,571,278 B1 | 2/2017 | Harwood et al. |
| 9,735,962 B1 | 8/2017 | Yang et al. |
| 9,774,586 B1 | 9/2017 | Roche et al. |
| 9,830,278 B1 | 11/2017 | Harwood et al. |
| 10,007,809 B1 | 6/2018 | Douglis et al. |
| 10,013,364 B1 | 7/2018 | O'Brien et al. |
| 10,061,717 B1 | 8/2018 | Yang et al. |
| 10,063,372 B1 | 8/2018 | Chiu et al. |
| 10,110,383 B1 | 10/2018 | Tamilarasan et al. |
| 10,205,594 B1 | 2/2019 | Kaufman |
| 10,678,953 B1* | 6/2020 | Allo ....................... G06F 9/445 |
| 2007/0136606 A1* | 6/2007 | Mizuno ................. H04L 63/062 |
| | | 713/189 |
| 2008/0082835 A1* | 4/2008 | Asher ..................... G06F 21/78 |
| | | 713/193 |
| 2009/0067633 A1* | 3/2009 | Dawson ................ H04L 9/0822 |
| | | 380/279 |
| 2010/0125730 A1* | 5/2010 | Dodgson ............... H04L 9/0833 |
| | | 713/153 |
| 2012/0284527 A1* | 11/2012 | Nagpal ................... H04L 63/04 |
| | | 713/189 |
| 2013/0086394 A1* | 4/2013 | Shimmitsu ............. G06F 21/78 |
| | | 713/193 |
| 2014/0095868 A1* | 4/2014 | Korthny ............. G06F 21/6218 |
| | | 713/165 |
| 2015/0006910 A1* | 1/2015 | Shapiro ............. G06F 12/1408 |
| | | 713/190 |
| 2015/0270956 A1* | 9/2015 | Basmov ................ H04L 9/0816 |
| | | 713/189 |
| 2016/0034721 A1* | 2/2016 | Moriguchi .......... G06F 12/1408 |
| | | 713/193 |

* cited by examiner

METHOD, APPARATUS AND COMPUTER PROGRAM PRODUCT FOR MANAGING ENCRYPTION KEY IN A STORAGE SYSTEM

FIELD

Embodiments of the present disclosure relate to the field of data storage, and more specifically, to method, apparatus and computer program product for managing a key in a storage system.

BACKGROUND

A storage system can be constructed on one or more physical storage devices for providing data storage capability. In order to enhance security of Input/Output (I/O) operations in the storage system, data targeted by the I/O operations can be encrypted. In the storage encryption technology, the controller-based hardware encryption technique has been increasingly recognized by the market due to its advantages in processing speed and security performance, especially for clients with high-level security needs. In the controller-based hardware encryption storage system, the encrypted hardware is embedded in a protocol controller and encrypts the data written into the storage device, or decrypts the data read from the storage device during I/O operations.

During the initialization procedure of the storage system, it is required that a key for encrypting/decrypting data is allocated to every physical disk of the storage system. When the storage device is being used, physical disks in the storage system do not remain unchanged. Instead, it is necessary to maintain the addition, deletion, replacement and the like of the physical disks. Generally, the key for encrypting/decrypting data varies from one physical disk to another. When a physical disk in the storage system changes, the encryption key for the physical disk is also redeployed in the encryption hardware.

Therefore, a solution for managing the encryption key in the storage system is desired.

SUMMARY

Embodiments of the present disclosure provide a solution for managing an encryption key in a storage system.

In a first aspect of the present disclosure, there is provided a method of managing an encryption key in a storage system. According to the method, an encryption key request is transmitted from a storage management component to a key management service component; an encryption key encrypted by the key management service component is obtained via the key management service component based on the encryption key request; the obtained encrypted encryption key is provided to the storage management component; correspondence between the encrypted encryption key and a storage device is maintained in the storage management component; and according to the correspondence, the encrypted encryption key corresponding to the storage device is registered to an encryption hardware unit, such that the encryption hardware unit can decrypt the encrypted encryption key to obtain the encryption key corresponding to the storage device.

In a second aspect of the present disclosure, there is provided an apparatus for managing an encryption key in a storage system. The apparatus includes: a processor; and a memory coupled to the processor and having instructions stored therein, which, when executed by the processor, cause the apparatus to perform acts of: transmitting an encryption key request from a storage management component to a key management service component; obtaining, via the key management service component, an encryption key encrypted by the key management service component based on the encryption key request; providing the obtained encrypted encryption key to the storage management component; maintaining, in the storage management component, correspondence between the encrypted encryption key and a storage device; and registering, according to the correspondence, an encrypted encryption key corresponding to the storage device to an encryption hardware unit, such that the encryption hardware unit can decrypt the encrypted encryption key to obtain the encryption key corresponding to the storage device.

In a third aspect of the present disclosure, there is provided a computer program product. The computer program product is tangibly stored on a computer-readable medium and includes machine-executable instructions which, when executed, cause a machine to perform the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As described in the Background, it is required that an encryption key for encrypting/decrypting data is allocated to each physical disk of a storage system in a hardware-based encrypted storage system. For the sake of security, the encryption key is usually created by a separate module/component and the encryption key itself also needs to be encrypted by a Key of Encryption Key (KEK), such that the encryption key will not be leaked in the process of being stored and deployed to the encryption hardware. Only an encryption hardware (controller) can obtain a real encryption key for encrypting and decrypting I/O operational data because the encryption hardware can be provided with the Key of Encryption Key (KEK) for decrypting the encrypted encryption key therein. As such, the encryption key for data encryption/decryption is invisible (encrypted) in the intermediate process of key management, which enables the encryption key for data to remain in an encrypted state during the management. Such mechanism can improve security performance of the storage system.

According to various embodiments of the present disclosure, there is provided a solution for managing the encryption key in the storage system. The solution can effectively manage the encryption key, such that the encryption hardware can obtain an encryption key for data encryption/decryption in the initialization, expansion, failure and update etc. of the storage system, and ensures the secure performance of the storage system.

For ease of description, hereinafter, the encryption key for encrypting/decrypting data is described as a "first encryption key"; another encryption key that encrypts and decrypts the encryption key for encrypting/decrypting data is described as a "second encryption key"; the first encryption key encrypted by the second encryption key is described as "encrypted first encryption key." Meanwhile, in order to simplify the description, it is assumed that the first encryption keys for all physical disks are encrypted with the same second encryption key in the storage system. Those skilled in the art can understand that a plurality of second encryption keys can also be employed to encrypt the first encryption keys in some storage systems. These variations can be easily contemplated or implemented with the teaching of the present disclosure, so they are also included in the scope of the present disclosure.

Figure 1:
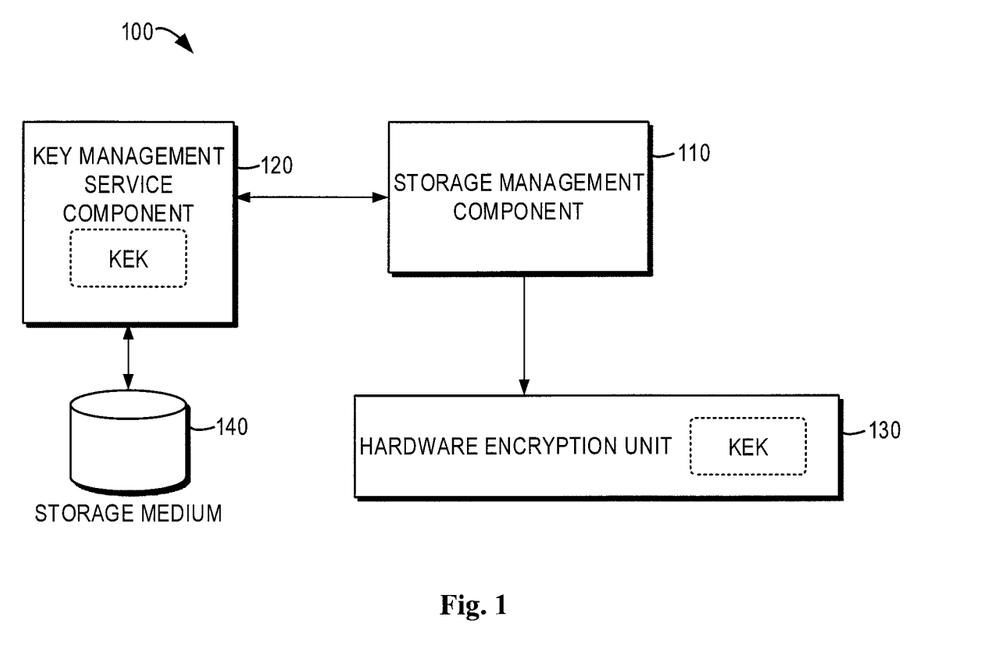
FIG. 1 illustrates a schematic diagram of architecture for managing an encryption key in a storage system according to one embodiment of the present disclosure.

FIG. 1 illustrates a schematic diagram of architecture 100 for managing an encryption key in a storage system according to one embodiment of the present disclosure.

As shown in FIG. 1, the architecture 100 according to one embodiment of the present disclosure includes a storage management component 110, a key management service component 120 and an encryption hardware unit 130. The architecture 100 also includes storage medium 140 for storing a respective encrypted first encryption key corresponding to each physical storage device. The architecture 100 also can include a physical encapsulation component (not shown) for implementing the adaptation of physical disk objects, ports, instructions and the like. For the purpose of simplifying the description, the architecture 100 shown in FIG. 1 only demonstrates the software component or the hardware component relevant to the key management targeted by the present disclosure. However, those skilled in the art can understand that the architecture for the storage system also can include other necessary assemblies/components according to specific implementations. Besides, a "component" generally refers to a functional module mainly implemented by software in the context of the present disclosure unless the context indicates otherwise, and "component" can create, configure and maintain various necessary objects and utilize corresponding storage medium. An "assembly" or "unit" in the context of the present disclosure generally refers to a hardware-based (such as controller) entity, which can have, for example, software codes of drive programs running thereon, and can include a memory and a cache etc.

For example, the storage management component 110 can manage a storage device, such as implementing a Redundant Array of Independent Disks (RAID) algorithm, so as to organize and manage the physical disks by way of RAID. The storage management component 110 can process the I/O operations in order to write data into a corresponding physical disk or read data from a corresponding physical disk. In response to the initialization, expansion, failure and update etc. of the storage system, the storage management component 110 may correspondingly create, delete and modify the maintained object corresponding to the storage device, such as a group of RAID, or a disk extent pool object, or a virtual disk object under mapped RAID architecture, and the like.

The key management service component 120 is a service module for key management.

The key management service component 120 can create, delete or update the first encryption key in response to an encryption key request of the storage management component 110. The second encryption key for the storage system is maintained in the key management service component 120 to encrypt each of the created first encryption keys.

The encryption hardware unit 130 is configured to encrypt data that is to be written into the storage device and decrypt data that is read from the storage device. The encryption hardware unit 130 is configured to have a second encryption key for decrypting the encrypted first encryption key. When the encrypted first encryption key is registered to the encryption hardware unit 130, the encryption hardware unit 130 can decrypt the encrypted first encryption key with the second encryption key to obtain the first encryption key, so as to encrypt and decrypt the I/O data using the first encryption key when I/O operations occur.

The storage medium 140 is used for storing a respective encrypted first encryption key corresponding to each physical storage device. Usually, the storage medium 140 can be a specified storage area in a system disk of the storage system, dedicated to storing the respective encrypted first encryption key corresponding to each physical storage device. As the system disk usually has a limited space, the storage space of the storage medium 140 is also restricted. Effective use of the storage space should be taken into account in designing the management solution for the encryption key. Therefore, it is necessary that the stored key index and format are suitably set for optimizing the usage of the storage medium 140. This will become clearer in combination with the following illustrations of embodiments.

According to various embodiments of the present disclosure, the encryption key request is initiated by the storage management component 110 to request a corresponding encryption key from the key management service component 120 or request the key management service component 120 to process an existing encryption key. In order to ensure security during management of the encryption key, the key management service component 120 provides only the encrypted first encryption key to the storage management component 110 without exposing the actual first encryption key. In the meantime, the encryption hardware unit 130 can decrypt the encrypted first encryption key as it is configured to have the second encryption key for encrypting the first encryption key, thereby obtaining the first encryption key, so as to encrypt or decrypt the data targeted by the I/O operation using the corresponding first encryption key.

The solution of managing the encryption key according to embodiments of the present disclosure will be described in detail below with reference to FIGS. 2-5. For ease of description, specific explanations with respect to the method, flow, configurations, data structures and the like will be provided with reference to the architecture 100 in the embodiment shown by FIG. 1. These embodiments or implementations can be realized independently, and also can be combined into one solution. Besides, those skilled in the art, when implementing the encryption key management solution of a specific storage device, have the ability to, as needed, accept or reject features and feature combinations in the solutions described below.

Figure 2:
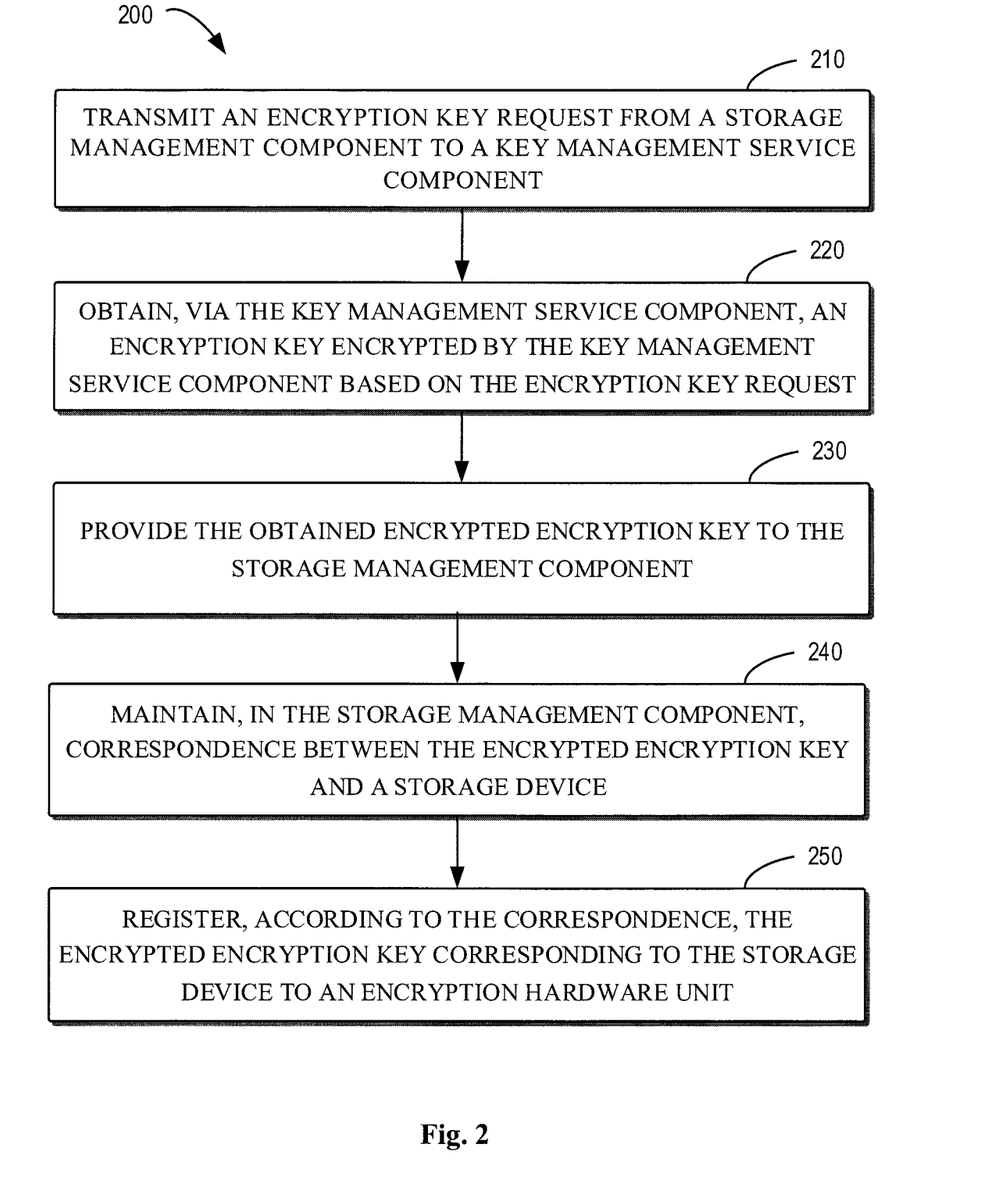
FIG. 2 illustrates a flowchart of a method of managing an encryption key in a storage system according to one embodiment of the present disclosure.

FIG. 2 illustrates a flowchart of a method 200 of managing the encryption key in the storage system according to one embodiment of the present disclosure.

As shown in FIG. 2, the encryption key request is transmitted from the storage management component 110 to the key management service component 120 at step 210, wherein the encryption key request can be transmitted in response to various trigger events. For example, the storage management component 110 needs to request the corresponding first encryption keys for all storage devices in the storage system upon the initialization of the storage system. As another example, when a certain storage device is damaged or replaced in the storage system, accordingly, the storage management component 110 also needs to initiate an encryption key request, so as to accordingly update the first encryption key corresponding to the storage device. Types of events that can trigger the encryption key request are provided here by way of example only. Those skilled in the art can understand that the events enumerated here are not exhaustive, and in practice, the trigger events of the encryption key request can be defined according to specific scenarios and needs.

At step 220, the first encryption key encrypted by the key management service component 120 is obtained by the key management service component 120 based on the encryption key request. As described above, the encryption key request can be of a variety of types depending on all kinds of events that trigger the encryption key request. For example, a type of the encryption key request includes one or more of an encryption key creating request, an encryption key retrieving request, an encryption key updating request, and an encryption key deleting request.

In one implementation, in response to the encryption key creating request transmitted by the storage management component 110, the key management service component 120 can create the encrypted first encryption key corresponding to the encryption key creating request. In addition, the key management service component 120 stores the encrypted first encryption key to a specified storage area of the system disk of the storage system, such as the storage medium 140 shown by FIG. 1.

In one implementation, in response to the encryption key retrieving request transmitted by the storage management component 110, the key management service component 120 can retrieve the encrypted first encryption key corresponding to the encryption key retrieving request from a specified storage area of the system disk of the storage system, such as the storage medium 140.

In one implementation, in response to the encryption key updating request transmitted by the storage management component 110, the key management service component 120 can create a new encrypted encryption key corresponding to the encryption key updating request. The key management service component 120 can further delete the encrypted first encryption key to be updated corresponding to the encryption key updating request from a specified storage area of the system disk of the storage system, such as the storage medium 140. Moreover, the key management service component 120 can store the created new encrypted encryption key to the specified storage area of the system disk of the storage system, such as the storage medium 140. It should be understood that the above operations, which are executed by the key management service component 120 in response to the encryption key updating request, are not necessarily performed in the sequence described above, and they can also be implemented in any other suitable sequence.

In one implementation, in response to the encryption key deleting request transmitted by the storage management component 110, the key management service component 120 can delete the encrypted first encryption key corresponding to the encryption key deleting request from a specified storage area of the system disk of the storage system, such as the storage medium 140.

Although types of encryption key requests and examples of processing those requests have been described above with reference to some implementations, it should also be appreciated that those skilled in the art can also define other types of encryption key requests as needed, and accordingly define how to perform a processing flow for this type of request.

The key management service component 120 provides the obtained encrypted first encryption key to the storage management component 110 at step 230. In one implementation, the key management service component 120 can write the encrypted first encryption key into an encryption key table maintained in a cache of the storage management component 110.

As such, the storage management component 110 maintains a correspondence between the encrypted first encryption key and the storage device at step 240.

At step 250, the storage management component 110 registers the encrypted first encryption key corresponding to the storage device to the encryption hardware unit 130 according to the correspondence between the encrypted first encryption key and the storage device, such that the encryption hardware unit 130 can decrypt the encrypted first encryption key to obtain the first encryption key corresponding to the storage device.

When the storage management component 110 determines that an input/output operation request is made to the storage device, the encryption hardware unit 130 can encrypt or decrypt the data corresponding to the input/output operation request using the first encryption key corresponding to the storage device. In one implementation, after the first encryption key for a certain storage device is successfully registered to the encryption hardware unit 130, the storage management component 110 can obtain a key handle, which is in one-to-one correspondence with the first encryption key used by the encryption hardware unit 130. By conveying the key handle in the procedure of processing the I/O request, the encryption hardware unit 130 can identify the corresponding first encryption key using the encryption handle, so as to encrypt or decrypt the data of the I/O request using the identified first encryption key.

Depending on different logical structures of the storage device, the encryption key management and storage according to the present disclosure can have different ways for key indexing and different key records.

In one implementation, the storage system can employ traditional RAID architecture. The traditional RAID can be created with a plurality of physical disks and each physical disk corresponds to one RAID. When an encrypted traditional RAID is created, it is required that one first encryption key should be obtained for each physical disk in each group of RAID and the first encryption key should also be registered to the encryption hardware unit 130. In this case, the storage device corresponding to the encrypted first encryption key can be a physical disk corresponding to the encrypted first encryption key in the group of RAID.

Figure 3:
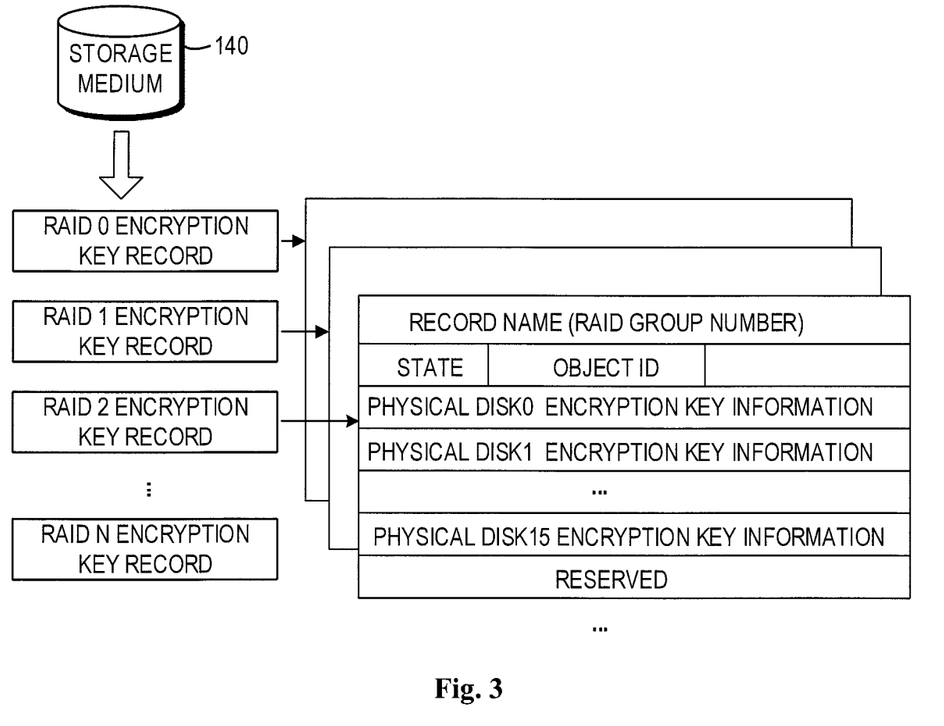
FIG. 3 illustrates a storage structure of an encrypted encryption key according to one embodiment of the present disclosure.

FIG. 3 illustrates a storage structure of an encrypted encryption key according to one embodiment of the present disclosure. The storage structure is suitable for the storage system that employs the traditional RAID architecture.

The encrypted first encryption key can be stored in the storage medium 140 for storing encrypted first encryption keys, being indexed at least by the identity information of the group of RAID. Specifically, each group of RAID has one encryption key record stored in the storage medium 140 as shown in FIG. 3, wherein each encryption key record is indicated by ("record_name," "value"). The "record_name" of the encryption key can be defined to be identified by the identity of the group of RAID. The identity of the group of RAID can include identification information, such as a number of the group of RAID, an identity of the RAID object and the like. The key management service component 120 can obtain, create, delete and update the encrypted first encryption key using "record_name" of the encryption key. Since at most 16 physical disks are allowed in one RAID group, 17 fields are reserved for the value of each encryption key record in the example shown in FIG. 3, wherein each of the 16 fields records the encrypted first encryption key corresponding to the physical disk of this RAID group. For example, the record_name can be defined as "RAID_2" for the encryption key record of RAID group 2. If physical disks No. 0, No. 3 and No. 8 have been used in RAID group 2, information about the encrypted first encryption key of a respective physical disk is recorded in the fields of the encryption key record corresponding to physical disks No. 0, No. 3 and No. 8. The last field can be reserved.

For example, the storage management component 110 can convey the number of the group of RAID in the request for retrieving the encryption key. In response to the request for retrieving the encryption key, the key management service component 120 obtains, according to the RAID group number in the request for retrieving the encryption key, the corresponding encryption key record from the storage medium 140 and sends back to the storage management component 110.

In the above example, the identity of the group of RAID is the number of the RAID group. It can be understood that, alternatively or additionally, the identity of the group of RAID can be the identity of the RAID object.

It can be seen that the encryption key record configured in the manner illustrated in FIG. 3 will not take up too much storage space of the storage medium 140 because the number of physical disks in each group of RAID is restricted by the maximum value (such as 16) under the traditional RAID architecture.

However, such encryption key record is not suitable for the mapped RAID architecture with a disk extent pool. It is because the disk extent pool is more flexible with regard to the configuration of physical disks, and allows allocation of segments of a single physical disk across the disk extent pool. Each disk extent pool uses up to 1000 physical disks. In the most common case, each disk extent pool also uses 10-100 physical disks. Because the encryption key record needs to be maintained in the storage medium 140, enough storage space must be reserved for each encryption key for the expansion of the disk extent pool. If the encryption key is managed simply through being indexed by the disk extent pool, and one corresponding encryption key record is defined for each disk extent pool, it is required that fields corresponding to 1000 physical disks are reserved for the encryption key of each disk extent pool to record the corresponding encrypted first encryption key. It is obvious that the storage space of the system disk is too limited to provide sufficient storage space.

Figure 4:
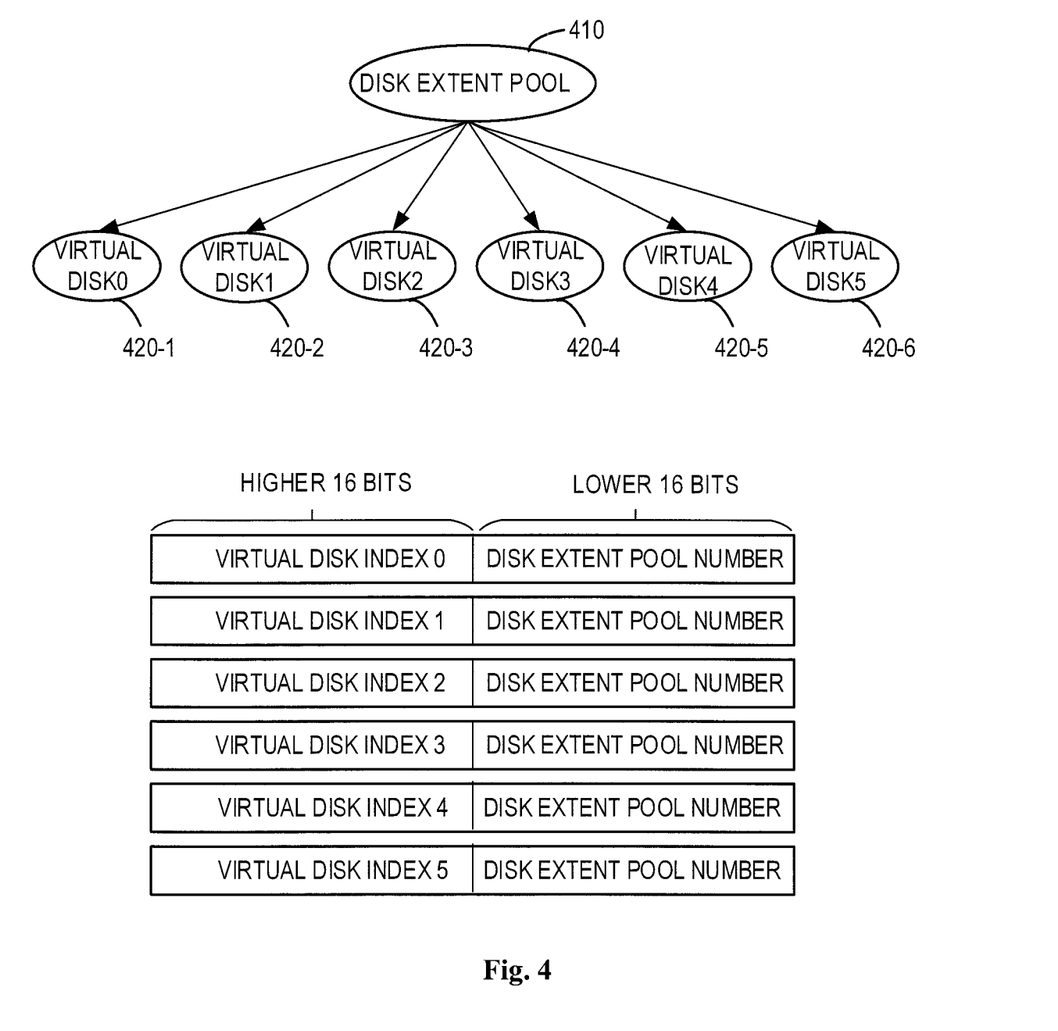
FIG. 4 illustrates mapped RAID architecture configuration according to one embodiment of the present disclosure.

One embodiment of the present disclosure provides a solution for users to manage the encryption key for the mapped RAID architecture with the disk extent pool. FIG. 4 illustrates mapped RAID architecture configuration according to one embodiment of the present disclosure. For the mapped RAID architecture, the storage management component 110 can be configured to create one or more disk extent pool objects and associate a plurality of virtual disk objects with each disk extent pool object, each virtual disk object being mapped to one physical disk. As shown in FIG. 4, sign 410 represents one disk extent pool object and signs 420-1 to 420-6 denote virtual disk objects associated with disk extent pool object 410, respectively. In order to distinguish between the physical disks which maps to the virtual disk objects, the number of a disk mapping pool to which the virtual disk object belongs, and a disk index of the virtual disk object in the disk mapping pool are at least recorded in the configuration information of each virtual disk object. For example, the virtual disk object can be configured using the data structure shown in FIG. 4: higher 16 bits represent a disk index of the virtual disk object in the disk extent pool, and lower 16 bits represent the number of the disk extent pool to which the virtual disk belongs.

When a disk extent pool object is created, the disk extent pool object is connected to the virtual disk object by "edges." Each "edge" is defined by a client identity and a server identity, wherein the client identity can be set as an object identity of the disk extent pool object and the server identity can be set as an object identity of the virtual disk object. Information about "edge" can be saved in a logical unit number database. When the storage system is enabled, the storage management component 110 will create the disk extent pool object and the virtual disk object in the manner described above.

Therefore, according to one embodiment of the present disclosure, the storage device corresponding to the encrypted first encryption key can include a physical disk mapped by the virtual disk object in the disk extent pool corresponding to the encrypted first encryption key.

Figure 5:
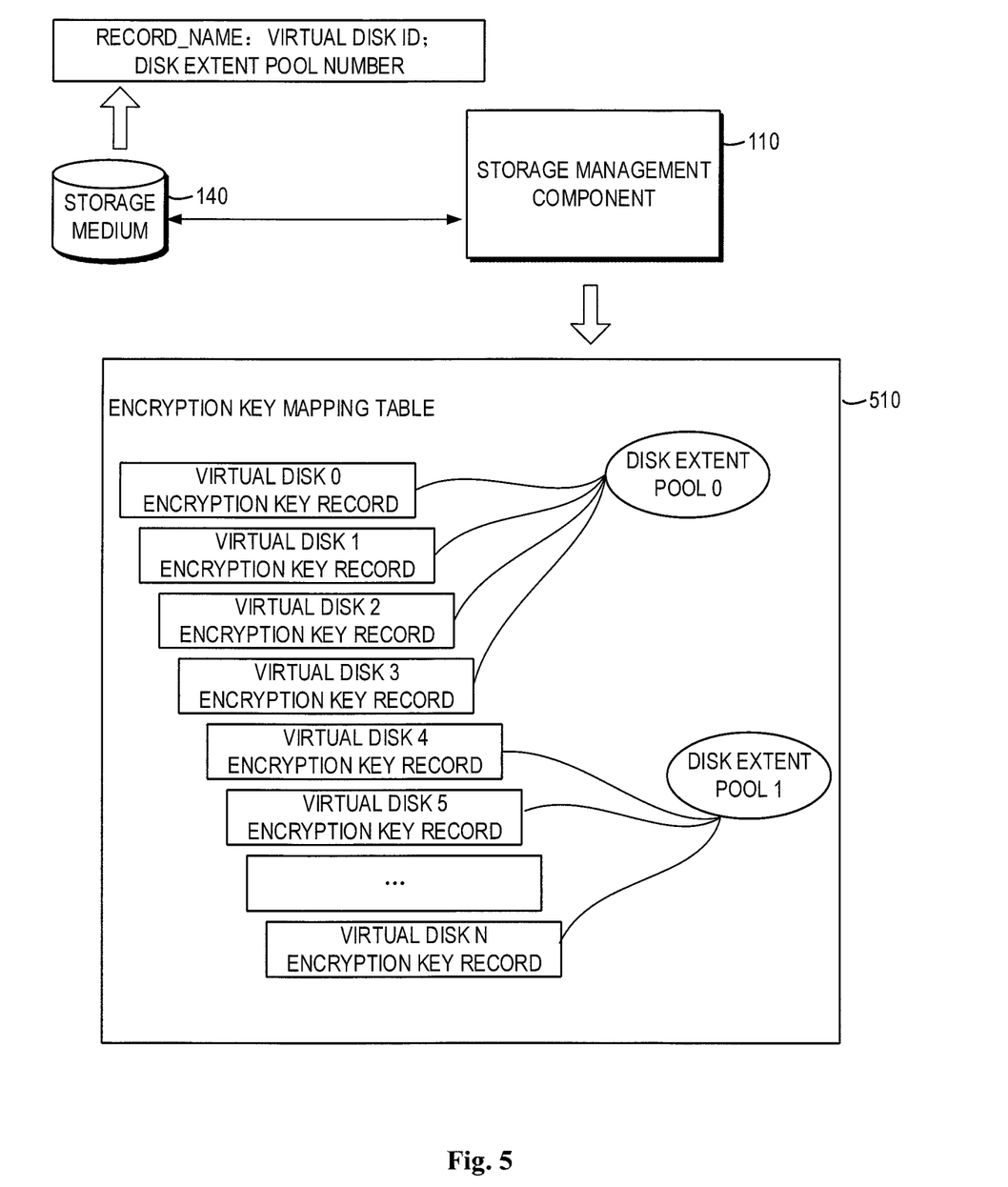
FIG. 5 illustrates a storage structure of an encrypted encryption key according to one embodiment of the present disclosure.

FIG. 5 illustrates a storage structure of an encrypted encryption key according to one embodiment of the present disclosure. The storage structure is suitable for a storage system that employs the mapped RAID architecture.

The encrypted first encryption key can be stored in the storage medium 140 for storing encrypted first encryption keys, being indexed at least by the identity information of the disk extent pool and the virtual disk object. The storage management component 110 can be configured to at least convey in the encryption key request the identity information of the disk extent pool and the virtual disk object associated with the request, such that the key management service component 120 can obtain from the storage medium 140 the encryption key record of the requested encrypted first encryption key. As shown in FIG. 5, the storage management component 110 can maintain in its cache the encryption key mapping table 510, to record the correspondence between the virtual disk objects in each disk extent pool and the obtained encrypted first encryption key. Each encryption key record is indicated by ("record_name," "value"). The "record_name" of the encryption key can be defined to be identified by the identities of the disk extent pool and the virtual disk object. The identity of the disk extent pool can include the number of the disk extent pool, the identity of the disk extent pool object and the like. The identity of the virtual disk object, for example, can include the object identity of the virtual disk object. The key management service component 120 can obtain, create, delete and update the encrypted first encryption key using "record_name" of the encryption key.

Figure 6:
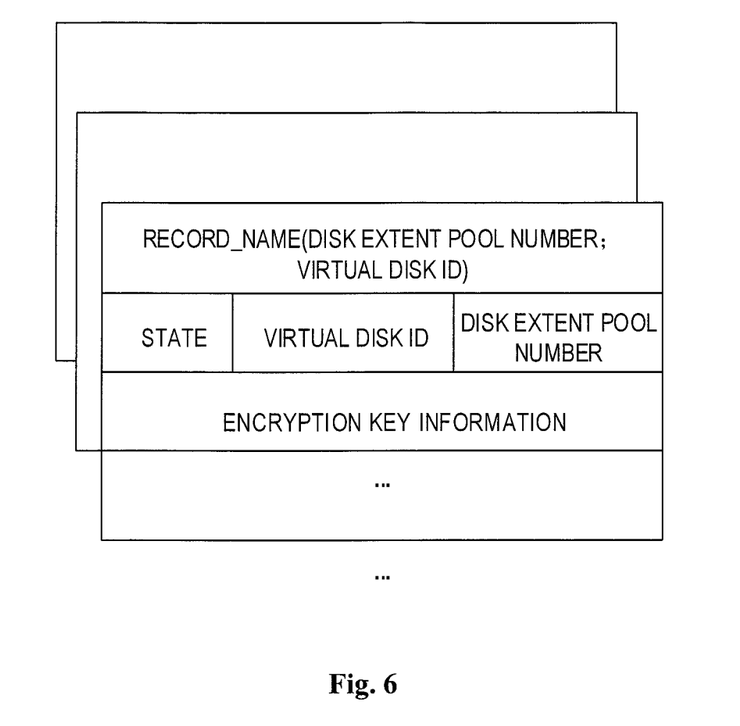
FIG. 6 illustrates a schematic diagram of an encryption key format according to one embodiment of the present disclosure.

As a more detailed illustration of the format of the encryption key record, FIG. 6 shows an example of an encryption key format.

As shown in FIG. 6, in this format, the "record_name" field is identified with the number of the disk extent pool and the object identity of the virtual disk object. The "state" field identifies whether the current recorded encryption key value is valid; the "object identity of virtual disk object" field records the virtual disk corresponding to the encryption key record; the "disk extent pool" field records the number of the disk extent pool to which the virtual disk corresponding to the encryption key record belongs or the object identity of the disk extent pool object; and the "encryption key information" field records information of the obtained encrypted first encryption key.

For example, the storage management component 110 can convey the number of the disk extent pool and the object identity of the virtual disk object in the request for retrieving the encryption key. In response to the request for retrieving the encryption key, the key management service component 120 obtains, according to the number of the disk extent pool and the object identity of the virtual disk object in the request for retrieving the encryption key, the corresponding encryption key record from the storage medium 140 and sends back to the storage management component 110. The correspondence between the encrypted first encryption key and the virtual disk object in the disk extent pool can be maintained, for example, by way of the encryption key table shown by FIG. 4 in the storage management component 110. Because the storage management component 110 has already established mapping between each of virtual disks and physical disks, the storage management component 110 can register the corresponding encrypted encryption key of the physical disk corresponding to the virtual disk to the encryption hardware unit 130 according to the correspondence between the encrypted first encryption key and the virtual disk object in the disk extent pool. Therefore, the encryption hardware unit 130 can decrypt the encrypted encryption key to obtain the encryption key corresponding to the storage device. When the storage management component 110 determines the input/output operation request for the storage device, the encryption hardware unit 130 can encrypt or decrypt the data corresponding to the input/output operation request using the encryption key.

Figure 7:
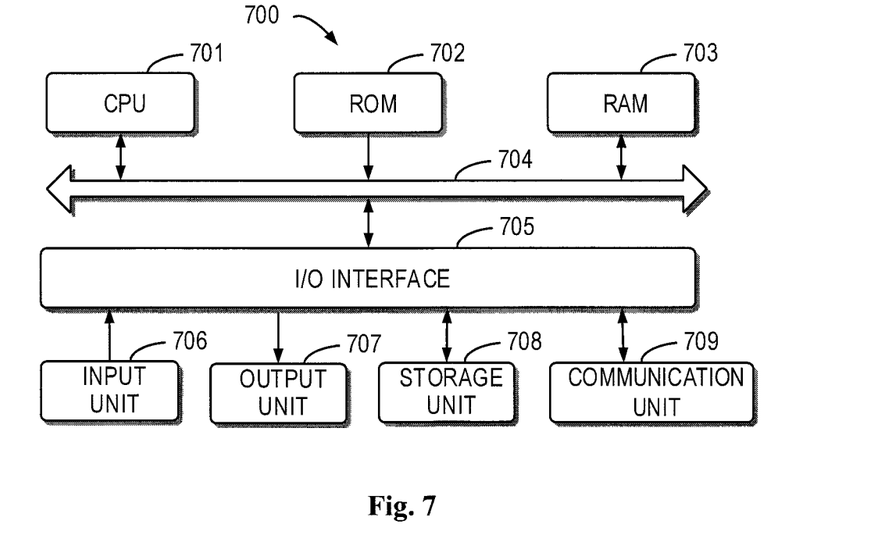
FIG. 7 illustrates a block diagram of an example device for implementing embodiments of the present disclosure.

FIG. 7 illustrates a schematic block diagram of an example device 700 for implementing embodiments of the present disclosure. The device 700 can implement one or more control appliances of the storage device of the present disclosure. As shown in FIG. 7, the device 700 includes a central process unit (CPU) 701, which can execute various suitable acts and processing based on the computer program instructions stored in the read-only memory (ROM) 702 or computer program instructions loaded in the random-access memory (RAM) 703 from a storage unit 708. The RAM 703 can also store all kinds of programs and data required by the operation of the device 700. CPU 701, ROM 702 and RAM 703 are connected to each other via a bus 704. The input/output (I/O) interface 705 is also connected to the bus 704.

A plurality of components in the device 700 are connected to the I/O interface 705, including: an input unit 706, such as a keyboard, a mouse and the like; an output unit 705, e.g., various kinds of displays and loudspeakers etc.; a storage unit 708, a magnetic disk, an optical disk and the like; and a communication unit 709, such as a network card, a modem, a wireless transceiver and the like. The communication unit 709 allows the device 700 to exchange information/data with other devices via the computer network, such as Internet, and/or various telecommunication networks.

The processing unit 701 executes various methods and processing described above, such as the method 200. For example, in some embodiments, the method 200 can be implemented as a computer software program or a computer program product tangibly included in the machine-readable medium, e.g., the storage unit 708. In some embodiments, the computer program can be partially or fully loaded and/or mounted to the device 700 via ROM 702 and/or communication unit 709. When the computer program is loaded to RAM 703 and executed by the CPU 701, one or more steps of the method 200 described above can be implemented. Alternatively, the CPU 701 can be configured to execute the method 200 in any other appropriate manners in other embodiments, such as by means of firmware.

Those skilled in the art should understand that each step of the above method of the present disclosure can be implemented by a general-purpose computing apparatus. They can be integrated on a single computing apparatus, or distributed on a network consisting of a plurality of computing apparatuses. Optionally, they can be implemented using the executable program codes of the computing apparatus, such that they are stored in the storage apparatus for the execution by the computing apparatus, or they are respectively manufactured into various integrated circuit assemblies, or multiple assemblies or steps in them are manufactured into a single integrated circuit assembly for implementation. Thus, the present disclosure is not restricted to any particular combinations of hardware and software.

It should be understood that although the above detailed description mentions several apparatuses or sub-apparatuses of the device, the division is only by way of example rather than being compulsory. In fact, features and functions of the above described two or more apparatuses can be materialized in one apparatus according to the embodiments of the present disclosure. On the contrary, features and functions of the above described one apparatus can be further divided and materialized by several apparatuses.

The above description is only optional embodiments of the present disclosure, which does not restrict the present disclosure. For those skilled in the art, the present disclosure can have various modifications and alterations. Any amendments, equivalent substitutions, improvements and the like should be encompassed within the protection scope of the present disclosure as long as they are within the spirit and principle of the present disclosure.

We claim:

1. A method of managing an encryption key in a storage system, comprising:
    transmitting an encryption key request from a storage management component to a key management service component;
    obtaining, via the key management service component, an encryption key encrypted by the key management service component based on the encryption key request;
    providing the obtained encrypted encryption key to the storage management component;
    maintaining, in the storage management component, correspondence between the encrypted encryption key and a storage device; and
    registering, according to the correspondence, the encrypted encryption key corresponding to the storage device to an encryption hardware unit, such that the encryption hardware unit can decrypt the encrypted encryption key to obtain the encryption key corresponding to the storage device,
    wherein the storage device corresponding to the encrypted encryption key comprises a physical disk which maps to a virtual disk object corresponding to the encrypted encryption key in a disk extent pool,
    wherein the encryption key request conveys at least identity information of the disk extent pool and the virtual disk object associated with the request, and
    wherein obtaining the encrypted encryption key based on the encryption key request includes accessing the encrypted encryption key from a mapping table indexed at least by the identity information of the disk extent pool and the virtual disk object.

2. The method of claim 1, wherein when the storage management component determines an input/output operation request for the storage device, the encryption hardware unit can encrypt or decrypt data corresponding to the input/output operation request by using the encryption key.

3. The method of claim 1, wherein a type of the encryption key request includes one or more of an encryption key creating request, an encryption key retrieving request, an encryption key updating request, and an encryption key deleting request.

4. The method of claim 3, wherein obtaining, via the key management service component, an encrypted encryption key based on the encryption key request comprises:
    in response to the encryption key creating request, creating an encrypted encryption key corresponding to the encryption key creating request via the key management service component; and
    storing the created encrypted encryption key in a specified storage area of a system disk of the storage system.

5. The method of claim 3, wherein obtaining, via the key management service component, an encrypted encryption key based on the encryption key request comprises:
    in response to the encryption key retrieving request, retrieving, via the key management service component, an encrypted encryption key corresponding to the encryption key retrieving request from a specified storage area of a system disk of the storage system.

6. The method of claim 3, wherein obtaining, via the key management service component, an encrypted encryption key based on the encryption key request comprises:
    in response to the encryption key updating request,
        creating, via the key management service component, a new encrypted encryption key corresponding to the encryption key updating request;
        deleting, from a specified storage area of a system disk of the storage system, an encrypted encryption key to be updated, which is corresponding to the encryption key updating request; and
        storing the created new encrypted encryption key in the specified storage area of the system disk of the storage system.

7. The method of claim 3, further comprising:
    in response to the encryption key deleting request, deleting an encrypted encryption key corresponding to the encryption key deleting request from a specified area of a system disk of the storage system.

8. The method of claim 1, wherein the identity information of the disk extent pool and the virtual disk object comprises: a number of the disk extent pool and an identity of the virtual disk object.

9. The method of claim 1, wherein maintaining, in the storage management component, correspondence between the encrypted encryption key and a storage device comprises:
    maintaining, in the storage management component, correspondence between the encrypted encryption key and the virtual disk object in the disk extent pool.

10. The computer program product of claim 1, further comprising configuring the virtual disk object using a data structure having a first set of bits that represent a disk index of the virtual disk object in the disk extent pool, and a second set of bits that represent a number of the disk extent pool to which the virtual disk object belongs.

11. A computer program product having a non-transitory computer readable medium which stores a set of instructions for managing an encryption key in a storage system; the set of instructions, when carried out by computerized circuitry of the storage system, causing the computerized circuitry to perform a method of:
    transmitting an encryption key request from a storage management component to a key management service component;

obtaining, via the key management service component, an encryption key encrypted by the key management service component based on the encryption key request;

providing the obtained encrypted encryption key to the storage management component;

maintaining, in the storage management component, correspondence between the encrypted encryption key and a storage device; and registering, according to the correspondence, the encrypted encryption key corresponding to the storage device to an encryption hardware unit, such that the encryption hardware unit can decrypt the encrypted encryption key to obtain the encryption key corresponding to the storage device, wherein the storage device corresponding to the encrypted encryption key comprises a physical disk which maps to a virtual disk object corresponding to the encrypted encryption key in a disk extent pool, wherein the encryption key request conveys at least identity information of the disk extent pool and the virtual disk object associated with the request, and wherein obtaining the encrypted encryption key based on the encryption key request includes accessing the encrypted encryption key from a mapping table indexed at least by the identity information of the disk extent pool and the virtual disk object.

12. An apparatus for managing an encryption key in a storage system, comprising:

a processor; and a memory coupled to the processor and having instructions stored therein, which, when executed by the processor, cause the apparatus to perform acts of:

transmitting an encryption key request from a storage management component to a key management service component;

obtaining, via the key management service component, an encryption key encrypted by the key management service component based on the encryption key request;

providing the obtained encrypted encryption key to the storage management component;

maintaining, in the storage management component, correspondence between the encrypted encryption key and a storage device; and registering, according to the correspondence, an encrypted encryption key corresponding to the storage device to an encryption hardware unit, such that the encryption hardware unit can decrypt the encrypted encryption key to obtain the encryption key corresponding to the storage device, wherein the storage device corresponding to the encrypted encryption key comprises a physical disk which maps to a virtual disk object corresponding to the encrypted encryption key in a disk extent pool, wherein the encryption key request conveys at least identity information of the disk extent pool and the virtual disk object associated with the request, and wherein obtaining the encrypted encryption key based on the encryption key request includes accessing the encrypted encryption key from a mapping table indexed at least by the identity information of the disk extent pool and the virtual disk object.

13. The apparatus of claim 12, wherein when the storage management component determines an input/output operation request for the storage device, the encryption hardware unit can encrypt or decrypt data corresponding to the input/output operation request by using the encryption key.

14. The apparatus of claim 12, wherein a type of the encryption key request includes one or more of an encryption key creating request, an encryption key retrieving request, an encryption key updating request, and an encryption key deleting request.

15. The apparatus of claim 14, wherein obtaining, via the key management service component, an encrypted encryption key based on the encryption key request comprises:

in response to the encryption key creating request, creating an encrypted encryption key corresponding to the encryption key creating request via the key management service component; and storing the created encrypted encryption key in a specified storage area of a system disk of the storage system.

16. The apparatus of claim 14, wherein obtaining, via the key management service component, an encrypted encryption key based on the encryption key request comprises:

in response to the encryption key retrieving request, retrieving, via the key management service component, an encrypted encryption key corresponding to the encryption key retrieving request from a specified storage area of a system disk of the storage system.

17. The apparatus of claim 14, wherein obtaining, via the key management service component, an encrypted encryption key based on the encryption key request comprises:

in response to the encryption key updating request, creating, via the key management service component, a new encrypted encryption key corresponding to the encryption key updating request, deleting, from a specified storage area of a system disk of the storage system, an encrypted encryption key to be updated, which is corresponding to the encryption key updating request, and storing the created new encrypted encryption key in the specified storage area of the system disk of the storage system.

18. The apparatus of claim 14, wherein the instructions, when executed by the processor, further cause the apparatus to perform acts of:

in response to the encryption key deleting request, deleting an encrypted encryption key corresponding to the encryption key deleting request from a specified storage area of a system disk of the storage system.

19. The apparatus of claim 12, wherein the identity information of the disk extent pool and the virtual disk object comprises: a number of the disk extent pool and an identity of the virtual disk object.

20. The apparatus of claim 12, wherein maintaining, in the storage management component, correspondence between the encrypted encryption key and a storage device comprises:

maintaining, in the storage management component, correspondence between the encrypted encryption key and the virtual disk object in the disk extent pool.

21. The computer program product of claim 11, wherein the disk extent pool to which the virtual disk object belongs is a pool that includes multiple virtual disk objects that implement a mapped RAID architecture.

* * * * *